(12) United States Patent
Boutnaru (10) Patent No.: US 11,182,340 B2
(45) Date of Patent: Nov. 23, 2021

(54) DATA TRANSFER SIZE REDUCTION

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

( * ) Notice: Subject to any disclaimer, the term of this patent is extended or adjusted under 35 U.S.C. 154(b) by 684 days.

(21) Appl. No.: 15/433,462

(22) Filed: Feb. 15, 2017

(65) Prior Publication Data
US 2018/0232387 A1 Aug. 16, 2018

(51) Int. Cl.
| | | |
|---|---|---|
| *G06F 16/10* | (2019.01) | |
| *G06F 16/13* | (2019.01) | |
| *G06F 16/16* | (2019.01) | |
| *H04L 29/08* | (2006.01) | |
| *G06F 16/58* | (2019.01) | |
| *G06F 21/62* | (2013.01) | |
| *G06F 16/583* | (2019.01) | |
| *G06F 16/532* | (2019.01) | |
| *H04L 12/743* | (2013.01) | |

(52) U.S. Cl.
CPC .......... *G06F 16/137* (2019.01); *G06F 16/164* (2019.01); *G06F 16/532* (2019.01); *G06F 16/58* (2019.01); *G06F 16/5838* (2019.01); *G06F 21/6218* (2013.01); *H04L 67/02* (2013.01); *H04L 67/34* (2013.01); *H04L 45/7453* (2013.01)

(58) Field of Classification Search
CPC ...... G06F 16/137; G06F 16/164; G06F 67/02; G06F 67/34; H04L 45/7453
See application file for complete search history.

(56) References Cited

U.S. PATENT DOCUMENTS

| | | | | | |
|---|---|---|---|---|---|
| 6,018,747 | A | * | 1/2000 | Burns | G06F 16/10 |
| 8,296,398 | B2 | * | 10/2012 | Lacapra | H04L 67/104 |
| | | | | | 709/219 |
| 8,447,740 | B1 | * | 5/2013 | Huang | G06F 16/1756 |
| | | | | | 707/692 |
| 8,510,848 | B1 | * | 8/2013 | Zhao | G06F 21/60 |
| | | | | | 726/26 |
| 9,852,149 | B1 | * | 12/2017 | Taylor | G06F 16/1844 |
| 2004/0230416 | A1 | * | 11/2004 | Ye | G06F 40/47 |
| | | | | | 704/5 |
| 2008/0162608 | A1 | * | 7/2008 | Torii | G06F 16/1827 |
| 2008/0198787 | A1 | * | 8/2008 | Nguyen | H04L 1/0084 |
| | | | | | 370/315 |
| 2010/0332401 | A1 | * | 12/2010 | Prahlad | G06F 3/0649 |
| | | | | | 705/80 |
| 2011/0320498 | A1 | * | 12/2011 | Flor | G06F 16/322 |
| | | | | | 707/797 |
| 2012/0011176 | A1 | * | 1/2012 | Aizman | G06F 16/183 |
| | | | | | 707/822 |

(Continued)

*Primary Examiner* — Alford W Kindred
*Assistant Examiner* — Tiffany Thuy Bui
(74) *Attorney, Agent, or Firm* — Kowert, Hood, Munyon, Rankin & Goetzel, P.C.

(57) ABSTRACT

A process of operating a communication system is provided. The process may include identifying data at a device. The process may further include determining that at least one other device includes at least a portion of the identified data. In addition, the process may include transmitting, to the at least one other device, identification information to enable the at least one other device to locate the identified data at the at least one other device.

17 Claims, 4 Drawing Sheets

(56) References Cited

U.S. PATENT DOCUMENTS

| | | | |
|---|---|---|---|
| 2013/0198459 A1* | 8/2013 | Joshi | G06F 12/084 |
| | | | 711/130 |
| 2013/0204849 A1* | 8/2013 | Chacko | G06F 3/0641 |
| | | | 707/692 |
| 2015/0006676 A1* | 1/2015 | Rounak | H04L 69/04 |
| | | | 709/219 |
| 2015/0310219 A1* | 10/2015 | Haager | G06F 21/602 |
| | | | 713/165 |
| 2016/0099963 A1* | 4/2016 | Mahaffey | H04L 63/0227 |
| | | | 726/25 |
| 2017/0289237 A1* | 10/2017 | Feltham | H04L 67/06 |

* cited by examiner

DATA TRANSFER SIZE REDUCTION

FIELD

The present disclosure relates generally to reducing data transfer sizes.

BACKGROUND

With the increased use of the Internet, Internet traffic continues to rise. In one example, data may be transmitted (e.g., one or more files) from one electronic device (e.g., a first server) to another electronic device (e.g., a second server). However, given the limited bandwidth of network communications, movement of data (e.g., one or more files) from one electronic device to another electronic device may be time consuming and resource expensive. Further, bandwidth may be limited and/or compression may not be a viable option (e.g., due to limited repetitions in the data). Applicant recognizes a need to improve the efficiency of data transmission between devices.

This background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DETAILED DESCRIPTION

Some embodiments of the present disclosure relate to improving the efficiency of data transmission between devices by reducing the amount of data that may be transmitted between the devices. For example, in some instances, a first device may have a data structure (e.g., a file) stored thereon that is designated for storage on a second device. The first device may receive instructions to perform operations to facilitate the obtaining of the data structure by the second device. In some instances, the data structure may include at least a portion that may be obtained based on data already stored on or otherwise accessible by the second device. For example, the data structure may include one or more lines of code that may be part of an operating system of the second device.

In some embodiments, instead of sending the entire data structure to the second device, the first device may be configured to send identification information that directs the second device on how to obtain at least the portion of the data structure from data accessible by the second device. For example, instead of sending the lines of code of the data structure that are part of the operating system of the second device, the first device may send identification information that indicates such lines of code and where the second device may locate them. The identification information may be such that it has a data size smaller than the portion that may be obtained from the data already stored on the second device. As such, in some instances, the efficiency of transmitting the data structure from the first device to the second device may be improved.

Further, some embodiments of the present disclosure relate to an encoding process that may enable a first device to generate an identifier-based file that may represent at least a portion of a data structure that may be obtained by the second device. The identifier-based file may include a data size smaller than a data size of the portion of the data structure that may be represented by the identifier-based file. The first device may communicate the identifier-based file to the second device and the second device may be configured to obtain the portion of the data represented by the identifier-based file using a decoding process described in further detail below.

According to at least one embodiment, a system may include one or more processors and one or more non-transitory computer-readable media coupled to the one or more processors. The one or more non-transitory computer-readable media may include instructions that, in response to being executed by the one or more processors, are configured to cause the system to perform operations. The operations may include identifying a first portion of a data structure that a device may be configured to obtain from data accessible by the device. The operations may also include generating identification information that directs the device on how to obtain the first portion from the data accessible by the device, wherein the identification information has a data size smaller than that of the first portion of the data structure. The operations may further include identifying a second portion of the data structure to be transmitted to the device. In addition, the operations may include transmitting the identification information and the second portion of the data structure to the device.

Moreover, in various embodiments, the operations may further include generating, at a device, an indexed file. In some embodiments, the indexed file may be generated from a local file, wherein the indexed file includes an assignment of each non-duplicative element in the local file to an identifier (e.g., a number). In other embodiments, the indexed file 116 may assign each file (e.g., each default file) at an associated device and/or one or more binary codes (e.g., a pattern of binary bits) to an identifier (e.g., a symbol such as a number). The operations may further include identifying a data file at the device. Further, the operations may include generating, via the indexed file, an identifier-based file that may represent data of the identified data file. In at least one embodiment, the identifier-based file may include one or more identifiers in a determined sequence to represent data of the identified data file. In other embodiments, the identifier-based file may include one or more identifiers (e.g., numbers), wherein each identifier is associated with a file. The identifier-based file may also include identification information, which may identify a portion of the file to access, and an n-gram, which may identify how much of the file to retrieve. Further, in some embodiments, the identifier-based file may include one or more identifiers (e.g., numbers), wherein each identifier may be associated with binary code. In these and other embodiments, the identifier-based file has a data size smaller than a data size of the identified data file. In addition, the operations may include transmitting the identifier-based file to at least one other device. For example, the identifier-based file may include a number-based file including one or more numbers in a determined sequence to represent data of the identified data file.

According to other embodiments, the present disclosure includes processes for improving the efficiency of data transmission between devices by reducing the amount of data that may be transmitted between the devices. More specifically, processes for encoding data and/or data leveraging within a communication system are provided. Yet other embodiments of the present disclosure include computer-readable media storage storing instructions that in response to being executed by one or more processors cause a system to perform instructions in accordance with one or more embodiments described herein.

Other aspects, as well as features and advantages of various aspects, will become apparent to those of skill in the art though consideration of the ensuing description, the accompanying drawings and the appended claims.

Figure 1:
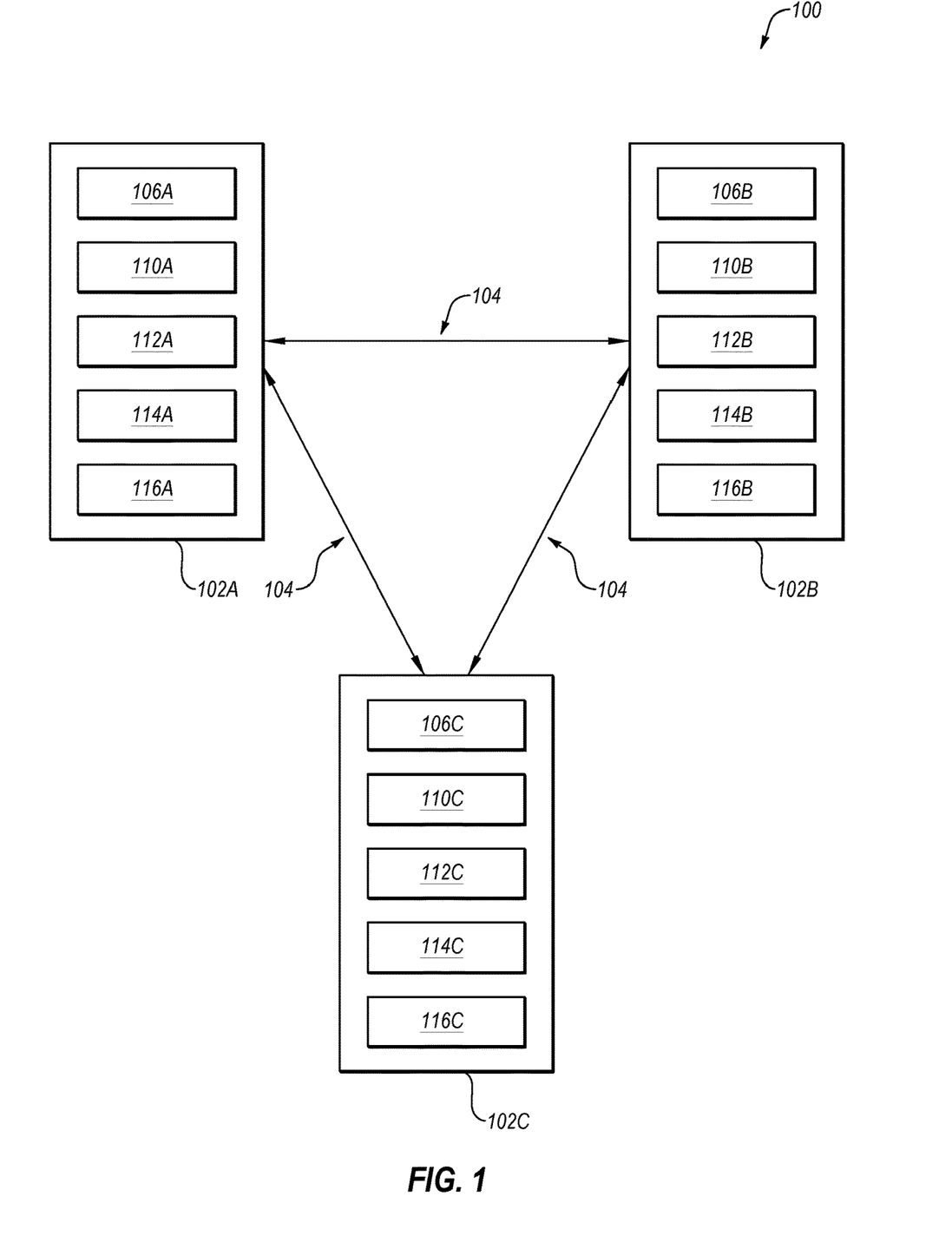
FIG. 1 illustrates an example system in which some embodiments may be implemented.

FIG. 1 illustrates an example system 100 in which one or more embodiments of the present disclosure may be implemented. System 100 includes a plurality of electronic devices 102A-102C configured to communicate via a network 104, which may include a wired network, a wireless network, or any combination thereof. Network 104 may include any suitable configuration or configurations including a star configuration, token ring configuration, or other configurations. Network 104 may include a local area network (LAN), a wide area network (WAN) (e.g., the Internet), and/or other interconnected data paths across which multiple devices may communicate. In some embodiments, network 104 may include a peer-to-peer network. Network 104 may also be coupled to or include portions of a telecommunications network that may enable communication of data in a variety of different communication protocols. In some embodiments, network 104 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and/or the like.

Each electronic device 102A-102C may include a computing device that may include a processor, memory, and network communication capabilities. Each device 102A-102C may be configured for communication with one or more other environment components via network 104. Some examples of device 102 include a server, a laptop computer, a desktop computer, a tablet computer, a mobile telephone, a smartphone, a personal digital assistant ("PDA"), a mobile e-mail device, or any other applicable electronic device capable of accessing network 104. More specifically, for example, each device 102A-102C may include computing system 400, as described below with reference to FIG. 4. Thus, each device 102A-102C may include memory similar to memory 406 described with reference to FIG. 4, each device 102A-102C may include one or more processors similar to a processor 404 described with reference to FIG. 4, and/or each device 102A-102C may include network communication capabilities similar to a communication unit 402 described with reference to FIG. 4.

Each electronic device 102A-102C may also include an operating system (OS) 106 (e.g., Windows XP, Windows 7, Macintosh, Linux, etc.) and at least one file 110, which may include, for example, an OS file. According to one or more embodiments, file 110 may include any file that is installed with an OS, such as a help file, a help manual, a wallpaper file, or any other default OS file. File 110 may include multiple elements (e.g., characters, words (e.g., a group of characters), (e.g., of the English language), Unicode characters, images, videos, etc.). Each device 102A-102C may further include one or more files 112 (e.g., source code, scripts, etc.) and/or application programs 114, which are common to each device 102A-102C. Further, according to various embodiments, each device 102A-102C may include at least one indexed file 116, which, as described more fully below, may be generated via file 110.

Modifications, additions, or omissions may be made to system 100 without departing from the scope of the present disclosure. For example, although system 100 includes three devices 102, system 100 may include two or more devices. Moreover, the separation of various components in the embodiments described herein is not meant to indicate that the separation occurs in all embodiments. It may be understood with the benefit of this disclosure that the described components may be integrated together in a single component or separated into multiple components.

According to at least one embodiment, wherein each device 102A-102C includes the same OS, and possibly the same version of OS, an application program on each device 102A-102C may be executed to generate indexed file 116 via assigning an identifier (e.g., a number from 1-5,000) to each non-duplicative element in file 110. Thus, in various embodiments, indexed file 116 may map each non-duplicative element therein to an identifier (e.g., a number). In some embodiments, indexed file 116, which may also be referred to herein as a "dictionary," may include a hash table.

In one example, if file 110 is a text file (e.g., a help file), each non-duplicative word in file 110 may be assigned a number. As another example, if file 110 is a wallpaper file, each non-duplicative image, or a series of non-duplicative pixels, in file 110 may be assigned a number. It is noted that, in some embodiments, because a process of creating an indexed file may be deterministic, if an application program on each device 102A-102C receives the same input (e.g., the same file, which may be local to each device (e.g., file 110)), each device 102A-102C may generate an indexed file that is the same as the indexed file generated by the other devices. In the event a device includes more than one file 110, the device may generate more than one indexed file. More specifically, each device 102A-102C may generate an indexed file 116 from each file 110. Yet more specifically, for example, one indexed file 116 at each device 102A-102C may be generated from a local OS help file and another indexed file 116 at each device 102A-102C may be generated from a local OS wallpaper file.

According to another embodiment wherein devices 102A-102C include two or more different operating systems (e.g., different operating systems or different versions of the same operating system), one or more indexed files 116 may be generated by one device (e.g., device 102B), and transmitted from the one device (e.g., device 102B) to one or more other devices (e.g., device 102A and 102C). For example, in some embodiments, a process to synchronize two or more devices (e.g., 102A, 102B, and 102C), may be performed, wherein the synchronization process may enable each device 102A-102C to identify its OS to the other devices. Further, a synchronization process may enable one or more indexed files 116 to be shared amongst devices 102A-102C. In yet another embodiment, one or more indexed files may be published (e.g., in the Cloud) by one device (e.g., device 102A), and one or more other devices (e.g., devices 102B and 102C) may be configured to access (e.g., via network 104) one or more published indexed files (e.g., in the Cloud). In any of the embodiments, the one or more indexed files may be used for encoding and/or decoding data transmissions in system 100.

Further, in the event a first device (e.g., device 102A) identifies a data file to transfer to one or more other devices (e.g., device 102B and 102C), the first device may generate an identifier-based file (e.g., a number-based file) via local indexed file 116. For example, the first device may identify the data elements included in the identified data file and may use indexed file 116 to determine the identifiers that correspond to the data elements included in the identified data file. The first device may then generate the identifier-based file for the identified data file in which the determined identifiers may be included in the identifier-based file.

In some scenarios, a number of bytes required to represent a plurality of elements (e.g., words, images, etc.) via a plurality of identifiers may be less than a number of bytes required to represent the plurality of elements in their original form. Thus, instead of sending a data file, which may include elements, such as words, images, etc., an identifier-based file including one or more identifiers, which represent one or more elements of the identified data file, may be transmitted from the first device (e.g., device 102A) to the second device (e.g., device 102B). Thus, in some embodiments, in response to receiving instructions to transmit a data file to one or more other devices, the first device (the "transmitting device" in this example) may identify the data file, and generate an identifier-based file, via the identifier to element assignments in local indexed file 116, wherein the identifier-based file represents the data of the data file. Further, it is noted that the identifier-based file may be compressed via any known and suitable process. Accordingly, an amount of data transferred between devices (e.g., devices 102A and 102B) may be reduced.

As noted above, each device (e.g., device 102A-102C) may include a matching indexed file. Thus, upon receipt of an identifier-based file (e.g., a number-based file) from a transmitting device, a receiving device may decode the identifier-based file to create the data initially identified by the transmitting device. More specifically, for example, in various embodiments wherein the identifier-based file includes a number-based file, each number in a received number-based file may be converted to one or more elements (e.g., words), as assigned in an indexed file, to create the data initially identified by the transmitting device.

As a more specific example, file 110A at device 102A may include, among others, the following elements: 31; and; calendar; days; first; has; January; is; month; of; the; and year. Further, in this example, indexed file 116A of device 102A may include, among others, the following element to number assignments: 31=7584; and =951; calendar=5321; days=49; first=112; has=98; January=2308; is =489; month=1784; of =287; the =56; and year=3321. Further, a data file identified at device 102A includes the following sentence "January is the first month of the calendar year and has 31 days". Thus, a number-based file including the sequence of numbers "2308 489 56 112 1784 287 56 3321 951 98 7584 49" may be generated to represent the data (i.e., "January is the first month of the calendar year and has 31 days") of the identified data file. Continuing with this example, device 102A may transmit the number-based file to another device, such as device 102B.

Upon receipt of the number-based filed from device 102A, device 102B may access indexed file 116B, which includes the element to number assignments as noted above with respect to indexed file 116A, and decode the number-based filed to generate a file including the data (i.e., "January is the first month of the calendar year and has 31 days") of the identified data file. More specifically, device 102B may receive the number-based file including the sequence of numbers. Further, device 102B may convert, via the element to number assignments in indexed file 116B, the sequence of numbers "2308 489 56 112 1784 287 56 3321 951 98 7584 49" to elements to generate the following sentence "January is the first month of the calendar year and has 31 days".

In another example, if the identified data at a transmitting device (e.g., device 102A) includes a script file, local indexed file 116 (e.g., generated via an OS help file), including its element (e.g., words and/or characters) to number assignments, may be used to generate a number-based file including multiple numbers in a proper sequence to represent each element of the script file. The transmitting device may transmit the number-based file to one or more receiving devices. Upon receipt of the number-based file, each of the one or more other devices (e.g., device 102B and 102C) may use its local indexed file 116 to decode the number-based file to generate a local version of the identified data, which in this example, is the script file.

In yet another example, if the identified data at a transmitting device (e.g., device 102A) includes an image (e.g., a wallpaper file), local indexed file 116, including its element (e.g., wallpaper) to number assignments, may be used to generate a number-based file including multiple numbers in a proper sequence to represent one or more images. The transmitting device may transmit the number-based file to one or more receiving devices. Upon receipt of the number-based file, each of the one or more other devices (e.g., device 102B and 102C) may use its local indexed file 116 to decode the number-based file to generate a local version of the identified data file, which in this example, is the wallpaper file.

According to various embodiments, indexed file 116 may assign each file at an associated device to an identifier (e.g., a number). Thus, in various embodiments, the identifier-based file, which may be generated from indexed file 116, may include one or more identifiers (e.g., numbers), wherein each identifier is associated with a file. The identifier-based file may also include identification information, which may identify a portion of the file to access. Further, the identifier-based file may include an n-gram, which may identify how much of a file to retrieve.

More specifically, as an example, a transmitting device (e.g., device 102A) may identify data (e.g., an image) that may be sent from the transmitting device to a receiving device (e.g., device 102B). Further, instead of sending the data to the receiving device, the transmitting device may send the identifier-based file to the receiving device. In this example, the identifier-based file may identify a first file (e.g., file "42"), a specific location within the first file, and a number of n-grams (e.g., 3-grams) to retrieve to access a part of the data (e.g., a first part of the image). Further, the identifier-based file may also identify a second file (e.g., file "77"), a specific location within the second file, and a number of n-grams (e.g., 6-grams) to retrieve to access another part of the data (e.g., a second part of the image).

Continuing with this example, the receiving device, upon receipt of the identifier-based file, may access, and possible retrieve, the 3 grams of the specific identified portion of file "42". The 3-grams may include a pattern of binary bits (e.g., 101). Further, the receiving device may access, and possible retrieve, the 6-grams of the identified specific portion of file "77". The 6-grams may include a pattern of binary bits (e.g., 110101).

According to some embodiments, the receiving device may track (e.g., via a ledger) information related to the n-grams of a file. More specifically, continuing with the example above, if the receiving device receives another request for the 3-grams of the identified portion of file "42", the receiving device may determine (e.g., via the ledger and without accessing file "42" on the local hard drive), that the 3-grams of the identified portion of file "42" is the binary pattern "101". Further, if the receiving device receives another request for the 6-grams of the identified portion of file "77", the receiving device may determine (e.g., via the ledger and without accessing file "77" on the local hard drive), that the 6-grams of the identified portion of file "77" is the binary pattern "110101".

In some embodiments wherein each device 102 includes the same OS and/or application version (e.g., Apache server), indexed file 116 may include an assignment of default system files (e.g., images, building scripts, implementation files, etc.) to an identifier (e.g., a binary code or a number). For example, a database, such as a database from the National Software Reference Library (NSRL), may be used to identify files on each device 102. Further, each device 102 may include and/or utilize open-source server, such as Apache HTTP server (e.g., Apache 2.2.0). In other embodiments wherein devices 102 do not all include the same OS, indexed file 116 may include an assignment of cross-platform files and/or applications (e.g., scripts, image files, configuration files, etc.) to an identifier (e.g., a binary code or a number). In some embodiments, indexed file 116 from one device (e.g., device 102A), which identifies files for a first OS (e.g., Windows), may be translated to represent cross-platform application and/or files for a different OS (e.g., Linux).

According to other embodiments, indexed file 116 may assign one or more binary codes (e.g., a pattern of binary bits) to an identifier (e.g., a number). Thus, in various embodiments, the identifier-based file, which may be generated from indexed file 116, may include the identifier (e.g., the number "1"), which may be associated with binary code (e.g., "1101"). Thus, in this example, a transmitting device (e.g., device 102A) may identify a binary code (e.g., representing data) that may be sent from the transmitting device to a receiving device (e.g., device 102B). Further, instead of sending the binary code to the receiving device, the transmitting device may send the identifier-based filed to the receiving device. In this example, the identifier-based file may include the number (e.g., number 1) which is assigned to the binary code in the indexed file. Thus, upon receipt of the identifier-based file, the receiving device may determine which files, or which portion of a file to access based on decoding the identifier-based file to determine the binary code (e.g., 1101).

In some embodiments, a transmitting device may indicate to a receiving device whether the transmitting device is communicating via an encoding process or a non-encoding process. For example, a transmitting device may identify three (3) files (e.g., file A, file B, and file C) to send to a receiving device. Further, the transmitting device may determine that the receiving device has two of the three files (e.g., the receiving device includes file A and file C, but does not include file B). Thus, for example, prior to sending data (e.g., the identifier-based file) for accessing file A on the receiving device, the transmitting device may notify the receiving device (e.g., via any suitable signaling process) that the transmitting device is in an encoding mode. Further, for example, after sending the data used to access file A and prior to sending file B, the transmitting device may indicate (e.g., via any suitable signaling process) that the transmitting device is in a non-encoding mode. Moreover, after sending file B, and prior to sending the data used to access file C, transmitting device may notify (e.g., via any suitable method) the receiving device that the transmitting device is in the encoding mode.

Thus, according to some embodiments, two or more devices may communicate via sending and/or receiving an identifier-based file (e.g. a number-based file), which may be used to lookup associated data (e.g., text, images, files, etc.). As a result, instead of sending each character, or each group of characters (e.g., words), applications, files, and/or objects (e.g. images) in a file, a device may send one or more identifiers (e.g., numbers) that may enable a receiving device to access and/or generate the data on the receiving device.

Figure 2:
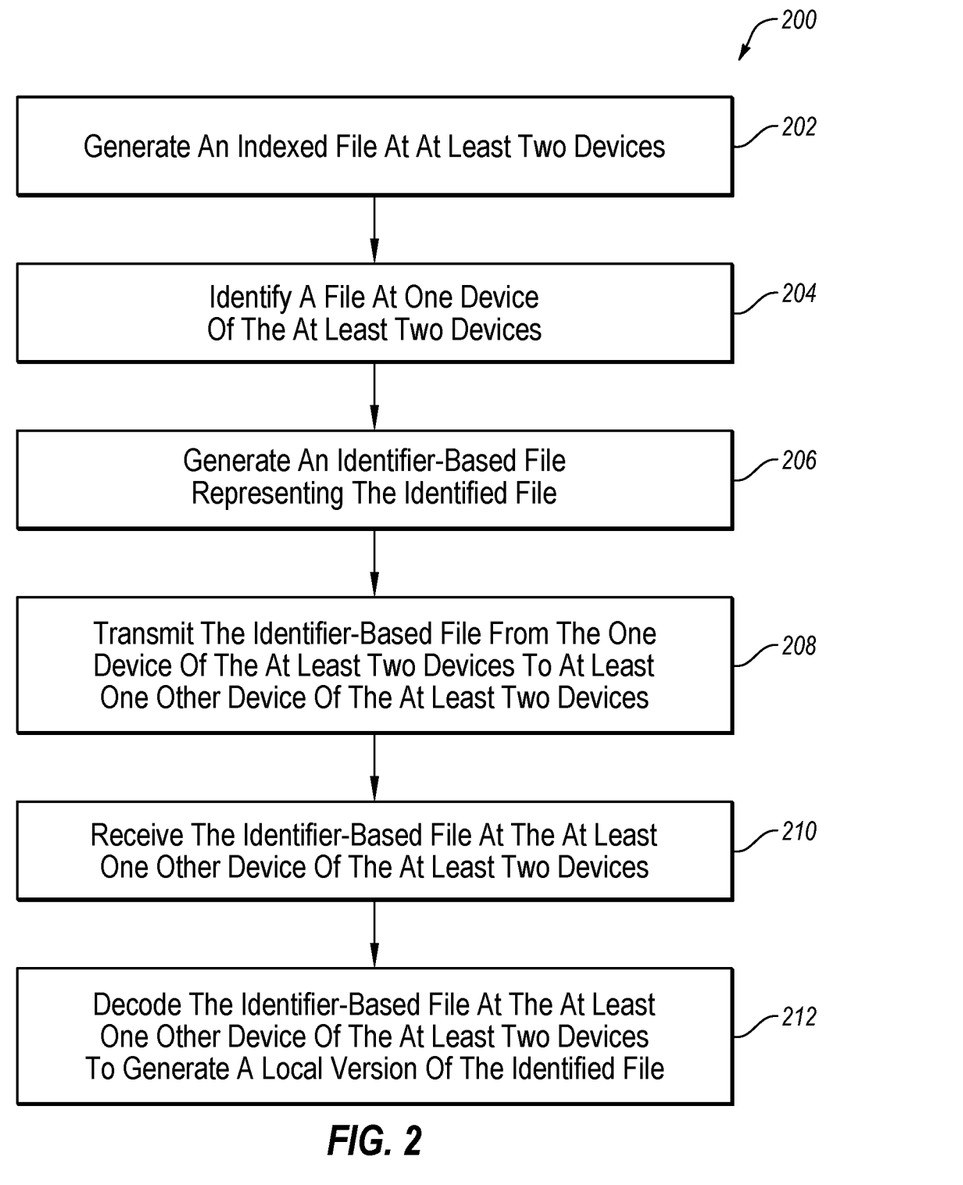
FIG. 2 is a flowchart depicting an example process of encoding and transferring data within a communication system.

FIG. 2 is a flowchart illustrating an example process 200 for encoding and/or transmitting data within a communication network. Process 200 may be arranged in accordance with at least one embodiment described herein. Process 200 may be implemented, in some embodiments, by a system, such as system 100 (see FIG. 1) and/or computing system 400 (see FIG. 4). Although illustrated as discrete blocks, various blocks of process 200 may be divided into additional blocks, combined into fewer blocks, or eliminated, depending on the desired implementation.

At block 202, an indexed file may be generated at two or more devices in a network, and process 200 may proceed to block 204. In one example, the indexed file may be generated from a local file (e.g., file 110), wherein the indexed file includes an identifier assignment for each non-duplicative element in the local file. As another example, the indexed file may include an assignment of each file at an associated device to an identifier (e.g., a number). As yet another example, the indexed file may include an assignment of one or more binary codes (e.g., a pattern of binary bits) to an identifier (e.g., a number). In one example, with reference to FIG. 1, an application program may be executed on each of device 102A, 102B, and 102C, to generate an indexed file for each local file (e.g., file 110).

At block 204, a data file at one device of the two or more devices may be identified, and process 200 may proceed to block 206. For example, the one device (e.g., device 102B) may, in response to receiving instruction to send a data file to another device (e.g., device 102A and/or device 102C), identify the data file (e.g., a script file) at device 102B.

At block 206, an identifier-based file representing the identified data file may be generated at the one device via an indexed file (e.g., local to the one device), and process 200 may proceed to block 208. For example, a device (e.g., device 102B) may access indexed file 116B and generate the identifier-based file, which, in some embodiments, may include a number-based file including multiple numbers in a proper sequence to represent data of the data file identified at block 204. As another example, the identifier-based file may include an identifier (e.g., the number "1"), which is associated with a file, identification information, which may identify a portion of the file to access, and an n-gram, which may identify how much of the file to retrieve. Further, in some embodiments, the identifier-based file may include one or more identifiers (e.g., numbers), wherein each identifier may be associated with binary code. In these and other embodiments, the identifier-based file has a data size smaller than a data size of the identified data file. In addition, the operations may include transmitting the identifier-based file to at least one other device.

At block 208, the identifier-based file may be transmitted from the one device to one or more other devices, and process 200 may proceed to block 210. For example, device 102B may transmit the identifier-based file, which may comprise a number-based file, to device 102A, device 102C, or both.

At block 210, the identifier-based file may be received by the one or more other devices, and process 200 may proceed to block 212. For example, device 102A, device 102C, or both, may receive the identifier-based file.

At block 212, the identifier-based file may be decoded at the one or more other devices. For example, upon determining that the received identifier-based file is an encoded file, device 102A may decode the identifier-based file via its local indexed file (e.g., indexed file 116A) to generate and/or access a file, which may include the data of the file identified at block 204. More specifically, in one example, device 102A may access indexed file 116A and convert the identifiers (e.g., numbers) in the identifier-based file to elements (e.g., characters, words, Unicode characters, images, etc.) to generate a file which includes the data of the file identified at block 204. In another example, device 102A may receive the identifier-based file, access indexed file 116A, and generate and/or access a local file based on data in the identifier-based file.

Modifications, additions, or omissions may be made to process 200 without departing from the scope of the present disclosure. For example, the operations of process 200 or may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

As noted above, some embodiments relate to a data leveraging process wherein instead of sending a file (e.g., a source code file), or a portion of the file, to a receiving device, a transmitting device may send information to the receiving device to enable the receiving device to access and use the file (e.g., a copy of the file local to the receiving device). More specifically, according to at least one embodiment, a first device (e.g., device 102C; see FIG. 1) may identify a data structure (e.g., a script, a software library, a code segment, source code, object code, an application programming interface, a java bytecode, an executable file, a program file (e.g., a Java file), a database file, etc.). The first device may also determine that a second device (e.g., device 102A; see FIG. 1) has access to, and possibly includes, at least a portion of the identified data structure. Thus, in this example, instead of sending all of the identified data structure to the second device, the first device may send identification information to the second device, wherein the identification information may enable the second device to identify, obtain, access, and/or use at least a portion of the identified data structure.

In some embodiments, devices 102A-102C may communicate with one another to determine what data exists on each device. For example, a transmitting device may transmit a list of information believed to be stored on a receiving device and/or request a list of information stored on the receiving device, and the receiving device may respond with an answer. More specifically, for example, the receiving device may respond with a list of data (e.g., scripts, function, software libraries, code segments, source code, object code, application programming interfaces, executable files, program files, database file, etc.) that the receiving device either includes or does not include. Moreover, according to various embodiments, a transmitting device may send a digest of a cryptographic hash function of an identified file to a receiving device. Further, the receiving device may include a hash table, which can be accessed by the transmitting device to determine whether or not the identified file exists on the receiving device. Further, in some embodiments, each device 102A-102C may include, or at least have access to, a ledger, which may identify data included on each device. Further, in some embodiments, a database such as an NSRL database may be used to identify files on each device. For example, NSRL may include the hash of files based on an OS and/or application version. Thus, files on each device may be known, and identifier (e.g., symbol) bit representations may be known.

In one example, a transmitting device may determine that a receiving device includes and/or has access to a first portion of an identified data structure. As one example, the transmitting device may determine that the receiving device may obtain the first portion of the identified data structure from data accessible by the receiving device. For example, the accessible data may reside on the receiving device and/or another device (e.g., within network 104 (see FIG. 1)). Further, in some embodiments, the transmitting device may further determine that the receiving neither includes nor has access to a second portion of the identified data structure. In this example, the transmitting device may send identification information to the receiving device, wherein the identification may instruct the receiving device how to obtain and/or access the first portion of the identified data structure.

According to various embodiments, the identification information may have a data size smaller than the first portion of the identified structure. By way of example, the identification information may include a file name, an address (e.g., a file path, a page number, a row number, word number, an n-gram, etc.), one or more offset values for indicating how much data (e.g., source code) to extract, a pointer (e.g., a hash pointer), etc.). In one embodiment, the identification information may include information that directs the second device on how to obtain at least the portion of the data structure from data accessible by the second device. More specifically, for example, the identification information may include information that directs the receiving device to obtain the first portion of the identified structure by generating the first portion of the identified structure from the data accessible by the receiving device. In one example, the identification information may include at least one identifier for identifying the data structure and/or a binary code, information for identifying a location within the data structure, and an n-gram indicative of an amount of the data structure to obtain.

Further, the identification information may further include instructions that enable the receiving device to use the first portion of the identified data structure. The instructions may include, for example, how and/or where to save the first portion of the identified data structure, whether the first portion of the identified data structure should be compiled, how to compile the first portion of the identified data structure, etc. Further, according to various embodiments, the transmitting device may encode (e.g., according to one or more embodiments described above) the identification information (e.g., as an identifier-based file) and send the encoded identification information to the receiving device.

Continuing with this example wherein the receiving device does not include the second portion of the identified data structure, the transmitting device may send the second portion of identified data structure to the receiving device. In addition, in some embodiments, the transmitting device may encode (e.g., according to one or more embodiments described above) the second portion of the identified data structure (e.g., as an identifier-based file) and send the encoded second portion to the receiving device.

In one example scenario, each operating system 106 may include source code that may be used by one or more local application programs. Instead of sending every line of source code of an application program, or every line of source code in a file, a transmitting device (e.g., device 102A) may send identification information (e.g., a file name, an address (e.g., a file path), a pointer, etc.) that enables a receiving device (e.g., device 102C) to obtain and/or access a copy (e.g., a local copy) of the file or at least a portion of the source code of the application program. In another example, a transmitting device (e.g., device 102A) may send a portion of a file, or a portion of the source code of an application program, as well as identification information (e.g., a file name, an address, and/or a pointer) that enables a receiving device (e.g., device 102C) to access and/or obtain (e.g., locally) other portions of the file or source code of the application program that may be required.

For example, each device 102A-102C may include a line of source code in file 112A (e.g., "success=ftp.connect( ) if (success !=true) {printf("error"); return;}"), which may be a standard FTP line of source code stored in each device (e.g., devices 102A, 102B, and 102C) and used by operating system 106 in each device 102A-102C. Continuing with this example, instead of sending the line of source code, a transmitting device (e.g., device 102A) may send, to a receiving device, a "pointer" (e.g., a hash pointer) to the line of source code local to the receiving device. Further, the transmitting device may send one or more values (e.g., start and end offset values) to the receiving device indicating how much of the source code to extract at the receiving device.

In an embodiment wherein a receiving device includes all the data included in the data structure (e.g., an entire identified data structure), as identified by a transmitting device, a "pointer" sent from the transmitting device may comprise a hash. In another embodiment wherein the receiving device does not include all the data included in the data structure, the transmitting device may send the portion of the data structure that the receiving device does not have, as well as a pointer, which, in this embodiment, may include the hash of the file and start and end offset values. The start and end offset values may enable the receiving device to identify and access the portion of the data structure stored on the receiving device.

In one example scenario, a transmitting device (e.g., device 102A) may include at least a portion of an application program, which, in this example, includes source code for a first function X and a second function Y. In this example, the function Y is called by the function X. Further, in response to receiving instructions to send data (e.g., source code for a first function X and a second function Y) to a receiving device, the transmitting device may, via accessing a ledger and/or via prior communication with a receiving device (e.g., device 102C), determine that the receiving device includes a local copy of the source code for the function Y but does not include a copy of the source code for the function X. Thus, in this example, the transmitting device may send the source code for the function X to the receiving device. For example, the transmitting device may encode the source code for the function X as an identifier-based file (e.g., a number-based file) in a manner as described above. Further, the transmitting device may send identification information to the receiving device that enables the receiving device to identify, obtain, access, and/or use a copy (e.g., a local copy) of the source code for the function Y. As an example, the identification information may include an address (e.g., a file path) and a "pointer" (e.g., a hash pointer) to one or more lines of source code of the function Y.

Continuing with this example, if the source code for the function X was sent as an identifier-based file (e.g., a number-based file), the receiving device may decode the identifier-based file in the manner described above to generate the source code for the function X. Further, in some embodiments, the receiving device may save the source code for the function X in an appropriate location (e.g., per instructions sent from the transmitting device) so as to enable the receiving device to compile and execute an application program including the function X and the function Y.

In another example scenario, a transmitting device (e.g., device 102A) may include an application program, which may call one or more software libraries (e.g., a Java Class Library (JCL). Further, in response to receiving instructions to send data (e.g., an application program and/or one or more software libraries) to a receiving device, the transmitting device may, via accessing a ledger and/or via prior communication with a receiving device (e.g., device 102C), determine that the receiving device includes a local copy of the one or more software libraries but does not include the application program (e.g., neither the source code nor object code). Thus, in this example, the transmitting device may send the application program (e.g., the source code and/or object code) to the receiving device. In one example, if the transmitting device intends to send source code for the application program to the receiving device, the transmitting device may encode the source code as an identifier-based file (e.g., a number-based file) according to the encoding process describe above, and send the number-based file to the receiving device. Further, the transmitting device may send identification information to the receiving device that enables the receiving device to identify, obtain, access, and/or use the one or more software libraries. As an example, the identification information may identify the one or more specific libraries by name and include an address (e.g., a file path) to one or more specific libraries on the second device.

Continuing with this example, if the source code for the application was sent as an identifier-based file, the receiving device may decode the identifier-based file in the manner described above to generate the source code for the application program. Further, in some embodiments, the receiving device may save the application program in an appropriate location (e.g., per instructions sent from the transmitting device) so as to enable the application program to successfully call the one or more software libraries.

In another example scenario, a transmitting device (e.g., device 102A) may receive instructions to send a spreadsheet to a receiving device. The transmitting device may, via accessing a ledger and/or via prior communication with a receiving device (e.g., device 102C), determine that the receiving device includes a local copy of the spreadsheet. Further, the transmitting device may determine that the spreadsheet on the receiving device may be updated. Thus, in this example, the transmitting device may send data (e.g., either encoded or non-encoded) to the receiving device for updating the spreadsheet. Further, the transmitting device may send identification information to the receiving device that enables the receiving device to identify, obtain, access, and/or use a copy (e.g., a local copy) of the spreadsheet. In addition, the transmitting device may send instructions on how the data received by the receiving device should be used to update the spreadsheet (e.g., what portion of the spreadsheet should be updated).

In yet another example scenario, a transmitting device (e.g., device 102A) may receive instructions to send an executable file to a receiving device. The transmitting device may, via accessing a ledger and/or via prior communication with a receiving device (e.g., device 102C), determine that the receiving device includes a local copy of the executable file but lacks an activation key for the executable file. Thus, in this example, the transmitting device may send the activation key and identification information to the receiving device, wherein the identification information may enable the receiving device to identify, obtain, access, and/or use the executable file, and to utilize the received activation key for activating and/or registering the executable file.

It is noted that although various embodiments are described with reference to text data (e.g., text-based files), the present disclosure is not so limited. Rather, embodiments may be applicable to any suitable data file, such as image files, audio files, video data, etc. For example, a first device (e.g., device 102C; see FIG. 1) may identify a video file (e.g., to be transmitted to a second device (e.g., device 102A; see FIG. 1)). The first device may also determine that the second device includes a local copy of the video file, or at least a portion of the video file. Thus, in this example, instead of sending the identified video file to the second device, the first device may send information to the second device, wherein the identification information (e.g., a file name, an address, a pointer, etc.) enables the second device to identify, obtain, access, and/or use a version (e.g., a local version) of the video file.

Figure 3:
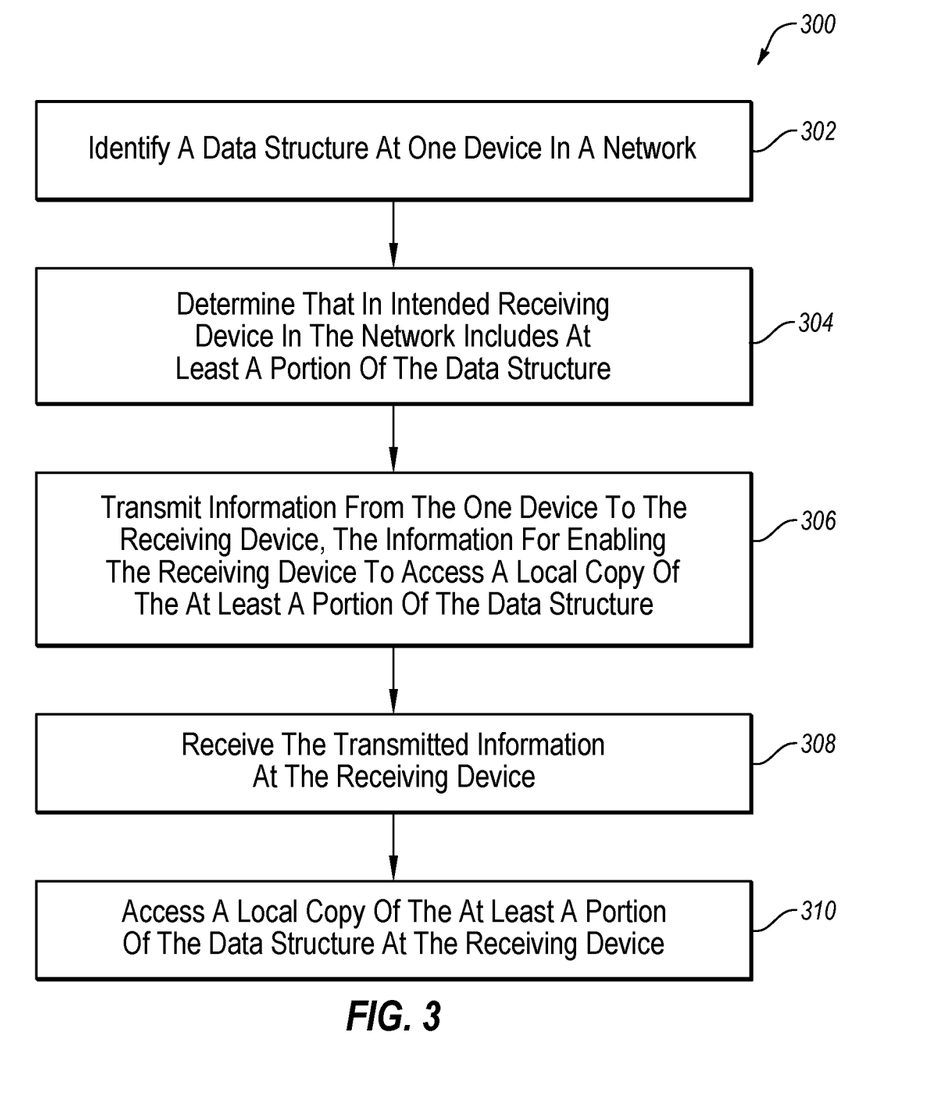
FIG. 3 is a flowchart depicting an example process of leveraging native code within a communication system.

FIG. 3 is a flowchart illustrating an example process 300 for operating a communication system. Process 300 may be arranged in accordance with at least one embodiment described herein. Process 300 may be implemented, in some embodiments, by a system, such as system 100 (see FIG. 1) and/or computing system 400 (see FIG. 4). Although illustrated as discrete blocks, various blocks of process 300 may be divided into additional blocks, combined into fewer blocks, or eliminated, depending on the desired implementation.

At block 302, data at one device of two or more devices, and which may be sent from the one device to one or more other devices, may be identified, and process 300 may proceed to block 304. For example, device 102B may, in response to receiving instructions to send a data structure to device 102A, may identify the data structure (e.g., at least a portion of a source code file).

At block 304, it may be determined that an intended receiving device has access to and/or includes at least a portion of the data structure, and process 300 may proceed to block 306. For example, device 102B may determine that at least a portion of the data structure (e.g., at least a portion of the source code file) exists on the intended receiving device (e.g., device 102A). More specifically, for example, device 102B may determine, via accessing a ledger and/or via prior communication with device 102A, that device 102A includes at least a portion of the data structure.

At block 306, identification information (e.g., a file path, an address (e.g., a page number, a row number, word number, etc.), a pointer, one or more offset values (e.g., start and end offset values), instructions, application identifier, program identifier, file identifier, operating system identifier, an n-gram, etc.), which enables a receiving device to identify, obtain, access, and/or use a local copy of the at least a portion of the data structure, may be generated and transmitted from the one device to the receiving device and process 300 may proceed to block 308. For example, device 102B may generate and transmit identification information (e.g., a file name, a pointer, an address, etc.) to receiving device 102A.

At block 308, the identification information transmitted from the one device may be received at the receiving device, and process 300 may proceed to block 310. For example, the identification information (e.g., a file name, a pointer, an address, etc.), which enables device 102A to identify, obtain, access, and/or use a local copy of the at least a portion of the data structure, may be received by device 102A.

At block 310, a local copy of the at least a portion of the identified data structure may be accessed at the receiving device. For example, based on the received identification information, device 102A may access at least a portion of the data structure (e.g., at least a portion of a source code file) at device 102A. After accessing the at least a portion of the identified data structure at the receiving device, the receiving device may retrieve and/or utilize the at least a portion of the identified data structure (e.g., execute an executable file, a code segment, and/or a script).

Modifications, additions, or omissions may be made to process 300 without departing from the scope of the present disclosure. For example, the operations of process 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

As noted above, various embodiments of the present disclosure may reduce data transfer sizes (e.g., via leveraging native code on a receiving device and/or encoding data prior to sending the data to the receiving device). Accordingly, various embodiments may improve the way systems and/or devices (e.g., a mobile device, a computer, server, etc.) operate and/or may improve computer-related technologies, such as wireless communication.

Figure 4:
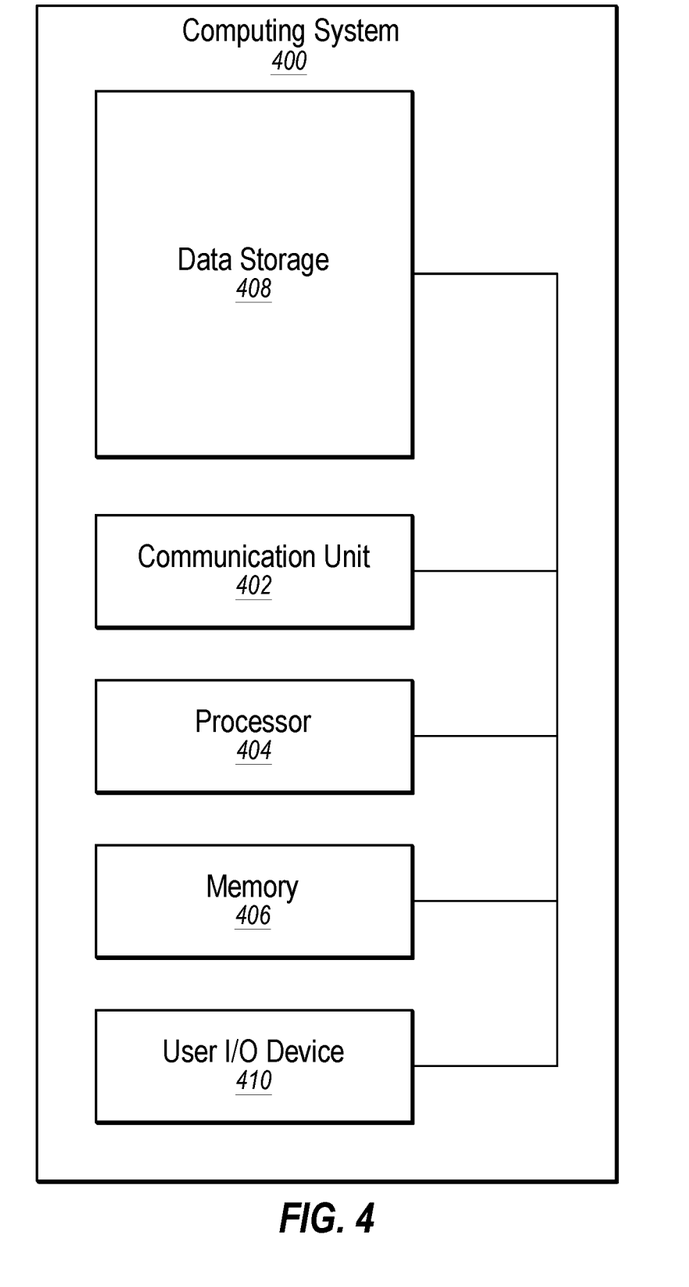
FIG. 4 illustrates an example computing system, in accordance with one or more embodiments.

FIG. 4 illustrates an example computing system 400. Computing system 400 may be configured for marketplace transactions, arranged in accordance with at least one embodiment described herein. Computing system 400 may include a communication unit 402, one or more processors 404, a memory 406, user input/output (I/O) device 410, and a data storage 408. For example, computing system 400 may include device 102 (see FIG. 1).

Processor 404 may include any suitable special-purpose or general-purpose computer, computing entity, or processing device including various computer hardware or software modules and may be configured to execute instructions stored on any applicable computer-readable storage media. For example, processor 404 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 4, it is understood that processor 404 may include any number of processors configured to perform individually or collectively any number of operations described herein. Additionally, one or more of the processors may be present on one or more different electronic devices. In some embodiments, processor 404 may interpret and/or execute program instructions and/or process data stored in memory 406, data storage 408, or memory 406 and data storage 408. In some embodiments, processor 404 may fetch program instructions from data storage 408 and load the program instructions in memory 406. After the program instructions are loaded into memory 406, processor 404 may execute the program instructions.

Memory 406 and data storage 408 may include computer-readable storage media for carrying or having computer-executable instructions or data structures stored thereon. Such computer-readable storage media may include any available media that may be accessed by a general-purpose or special-purpose computer, such as the processor 404. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause processor 404 to perform a certain operation or group of operations.

Communication unit 402 may include hardware configured to receive and send communications. In some embodiments, communication unit 402 may include an antenna, a wired port, and/or modulation/demodulation hardware, among other communication hardware devices. In particular, communication unit 402 may be configured to receive a communication (e.g., from a remote device) and present the communication to processor 404 for classifying or to send a communication from processor 404 to another device or network.

I/O device 410 may include hardware configured to notify a user of computing system 400 of a communication, present a communication to a user, or to notify a user of a communication and present the communication to the user. In some embodiments, I/O device 410 may include a speaker, a microphone, a display, a keyboard, and/or a touch screen, among other hardware devices. In these and other embodiments, I/O device 410 may also be configured to receive input from a user of computing system 400.

In view of this disclosure, it will be appreciated that modifications, additions, or omissions may be made to system 400 without departing from the scope of the present disclosure. For example, in some embodiments, device 400 may not include I/O device 410. In these and other embodiments, system 400 may be a server or other computing device that monitors for occurrence of monitored events using communication unit 402. In some embodiments, the different components of system 400 may be physically separate or may be communicatively coupled via any suitable mechanism. For example, data storage 408 may be part of a storage device that is separate from a server, which includes processor 404, memory 406, and the communication interface, that is communicatively coupled to the storage device.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system, comprising:
   one or more processors; and
   one or more non-transitory computer-readable media coupled to the one or more processors and including instructions that, in response to being executed by the one or more processors, are configured to cause a system to perform operations, the operations comprising:
   receiving, at the system, instructions to transmit a data structure stored on the system to a receiving device that does not currently have the data structure stored thereon, wherein the data structure includes an application program; and
   in response to receiving the instructions:
   identifying a first portion of the data structure that the receiving device is configured to obtain from operating system data installed on the receiving device in conjunction with installation of an operating system on the receiving device, wherein the first portion includes source code that is used by the application program;
   generating identification information that directs the receiving device on how to obtain the first portion from the installed operating system data, the identification information having a data size smaller than that of the first portion of the data structure, wherein the identification information includes a pointer to the source code but not the source code itself;
   identifying a second portion of the data structure to be transmitted to the receiving device; and
   instead of transmitting the entire data structure to the receiving device, transmitting the identification information and the second portion of the data structure to the receiving device.

2. The system of claim 1, wherein the identification information comprises at least one identifier selected from a group of identifiers consisting of: a name of a file that includes the first portion of the identified data structure, an n-gram, an address of the file, a pointer to the file, and one or more values indicative of a location of the first portion of the data structure.

3. The system of claim 1, wherein the identification information includes information that directs the receiving device to obtain the first portion by generating the first portion from the operating system data.

4. The system of claim 1, further comprising:
   generating an indexed file from the data structure and including an assignment of each non-duplicative element in the data structure to an identifier; and
   generating, via the indexed file, an identifier-based file including one or more identifiers representing the second portion of the data structure, the identifier-based file having a data size smaller than that of the second portion of the data structure.

5. The system of claim 4, wherein transmitting the second portion of the data structure comprises transmitting the identifier-based file to the receiving device.

6. The system of claim 5, wherein the identifier-based file is decodable at the receiving device via another indexed file to generate a file including the second portion of the data structure.

7. The system of claim 4, wherein the identifier-based file includes an identifier for identifying the first portion of the data structure, information for identifying a location within the data structure, and an n-gram indicative of an amount of the data structure to obtain.

8. The system of claim 1, wherein identifying the second portion includes determining that the second portion is not stored on the receiving device or determining that the receiving device is unable to generate the second portion from data accessible by the receiving device.

9. A computer-implemented process, comprising:
   generating, at a first device, an indexed file from a local file, the indexed file including an assignment of at least one element of the local file to an identifier, wherein the local file includes source code;
   receiving, at the first device, instructions to transmit the local file to a second device; and in response to receiving the instructions:
: identifying a first portion of the local file that the second device is operable to obtain from operating system data installed on the second device in conjunction with installation of an operating system on the second device, wherein the first portion of the local file includes one or more lines of source code that are included in the operating system data;
: identifying a second portion of the local file to be transmitted to the second device;
: generating, via the indexed file, an identifier-based file including one or more identifiers to represent the first portion of the local file, the identifier-based file having a data size smaller than a data size of the first portion of the local file, wherein the identifier-based file is useable by the second device to obtain a copy of the first portion of the local file from operating system data installed on the second device, wherein the identifier-based file includes a pointer to the one or more lines of source code but not the one or more lines of source code; and
: instead of transmitting the local file to the second device, transmitting the identifier-based file and the second portion of the local file to the second device.

10. The process of claim 9, further comprising:
receiving the identifier-based file at the second device; and
: generating, at the second device, a second local file including the data of the first portion of the local file based on the received identifier-based file.

11. The process of claim 10, wherein generating, at second device, the second local file includes generating the second local file at the second device via decoding the received identifier-based file based on a second indexed file at the second device; and
: wherein the decoding includes determining a plurality of elements in the second local file based on a plurality of identifiers in the received identifier-based file.

12. The process of claim 9, further comprising storing the indexed file in the Cloud to enable the second device to access the indexed file.

13. The process of claim 9, further comprising:
identifying a second portion of the local file that the second device is not operable to obtain from the operating system data installed on the second device; and
transmitting the second portion of the local file to the second device.

14. One or more non-transitory computer-readable media that include instructions that, in response to being executed by one or more processors, are configured to cause a system to perform operations, the operations comprising:
receiving, at a first device, instructions to transmit a data structure stored on the first device to a second device that does not currently have the data structure stored thereon; and
in response to receiving the instructions:
: identifying a first portion of the data structure at the first device;
: determining that the first portion of the data structure is included in operating system data that is installed on the first device in conjunction with installation of an operating system on the first device;
: determining that the second device includes a local version of the first portion of the data structure based on the second device having the operating system installed thereon;
: identifying a second portion of the data structure to be transmitted to the second device;
: instead of transmitting the data structure to the second device, transmitting, to the second device, identification information usable by the second device to identify the local version of the first portion of the data structure included in the operating system data and the second portion of the data structure, wherein the identification information and second portion have a smaller data size than the data structure;
: identifying an additional data structure at the first device;
: determining that the second device does not include the identified additional data structure;
: generating an identifier-based file including one or more identifiers in a sequence to represent data of the additional data structure; and
: transmitting the identifier-based file to the second device.

15. The computer-readable media of claim 14, wherein the identification information comprises at least one identifier for identifying the data structure, information for identifying a location within the data structure, and an n-gram indicative of an amount of the data structure to obtain.

16. The computer-readable media of claim 14, wherein generating an identifier-based file comprises generating the identifier-based file via an indexed file including an assignment of each non-duplicative element in a local file to an identifier, wherein each of the first device and the second device include a local copy of the indexed file or are configured to access the indexed file.

17. The computer-readable media of claim 14, wherein generating an identifier-based file comprises generating a number-based file comprising:
generating, at the first device, an indexed file from a local file, the indexed file including an assignment of each non-duplicative element in the local file to a number; and
generating, via the indexed file, the number-based file including one or more numbers in a determined sequence to represent data of the additional data structure, the number-based file having a data size smaller than a data size of the additional data structure.

* * * * *